United States Patent [19]
Tomita et al.

[11] Patent Number: 5,926,246
[45] Date of Patent: *Jul. 20, 1999

[54] METHOD FOR THE CORRECTION OF A DEFECT IN A LIQUID CRYSTAL DISPLAY DEVICE

[75] Inventors: Yasukazu Tomita, Osaka; Masami Inoue, Yamatokoriyama; Toshiyuki Makii, Kitakatsuragi-gun; Osamu Miyazaki, Tenri; Akihisa Iwamoto, Taki-gun; Masuji Tanimura, Souraku-gun; Hiroshi Nakanishi, Sakurai, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/558,954
[22] Filed: Nov. 13, 1995

[30] Foreign Application Priority Data

Nov. 15, 1994 [JP] Japan ..................................... 6-280819
Dec. 27, 1994 [JP] Japan ..................................... 6-326098

[51] Int. Cl.[6] ................................................ G02F 1/1333
[52] U.S. Cl. ............................................................ 349/192
[58] Field of Search ....................................... 349/125, 192

[56] References Cited

U.S. PATENT DOCUMENTS 5,636,042  6/1997  Nakamura et al. ..................... 349/124

FOREIGN PATENT DOCUMENTS 60-243635  12/1985  Japan .
1-187532   7/1989   Japan .
3-21928    1/1991   Japan .
4-301615   10/1992  Japan .

*Primary Examiner*—William L. Sikes
*Assistant Examiner*—James Dudek
*Attorney, Agent, or Firm*—David G. Conlin; William J. Daley, Jr.

[57] ABSTRACT

Laser beam irradiation spots are formed in a delta arrangement on a defective pixel present in a liquid crystal panel so that liquid crystal molecules in areas surrounding the irradiation spots are oriented vertically. Alternatively, an aligning film in a defective pixel is irradiated with a laser to form minute grooves in a different direction than the rubbing direction of the aligning film, whereby the orientation of the liquid crystal is changed so that the liquid crystal between the aligning films is no longer twisted. Thereby, a defective pixel present in a liquid crystal display panel can be made inconspicuous, and as a result, degradation of the display quality of the liquid crystal display device after correction can be prevented.

8 Claims, 7 Drawing Sheets

METHOD FOR THE CORRECTION OF A DEFECT IN A LIQUID CRYSTAL DISPLAY DEVICE

BACKGROUND OF THE INVENTION (1) Field of the Invention

The present invention relates to a method for the correction of a defective pixel in a liquid crystal display device, and in particular, to a method for the correction of a defect in a liquid crystal display device, wherein a defective pixel is corrected by irradiation with laser beams.

(2) Description of the Prior Art

Liquid crystal display devices can be driven at low voltages and low electric power, and have been utilized and commercially available as small, thin-type flat panel displays in a wide range of products. Matrix-type liquid crystal display devices are known as one type of such liquid crystal display devices. In particular, a liquid crystal display device with an active matrix driving system is configured such that switching elements such as TFTs (Thin Film Transistors) or MIM (Metal Insulator Metal) Diodes, or the like, are connected to pixel electrodes which are arranged in a matrix-like pattern on one of a pair of glass substrates which are bonded together. Selection and non-selection of all the pixel electrodes is carried out by the switching operation of these switching elements, to achieve display operation. For this reason, a liquid crystal display device of an active matrix driving type does not exhibit crosstalk at the time of non-selection, therefore achieving high quality display. Such crosstalk is a drawback of liquid crystal display devices of a simple matrix driving type.

Since the aforementioned switching element generally has a multi-layered structure consisting of semiconductor layer(s), insulation layer(s), and various types of electrodes for driving of the liquid crystal, which are layered onto a glass substrate, patterning of the layers onto the glass substrate is repeated in order to manufacture the switching element. For this reason, there are cases in which defective switching elements which do not function normally due to disconnection, short-circuit, or the like, are produced at the time of manufacture of the switching elements. Thus, pixels comprising pixel electrodes connected to defective switching elements become defective pixels to which voltage can not be applied. Particularly in the case of liquid crystal display devices in Normally White Mode, which is a display operation mode wherein the display screen is white when voltage is not applied, these defective pixels are found as bright-spot defects through which light is constantly transmitted. Besides a defect in the switching element, damage to a pixel electrode or aligning film can also cause a bright spot.

Various methods for correcting bright-spot defects by using laser beams to irradiate the area around the bright-spot defect in the liquid crystal display panel have been proposed as methods for the correction of bright-spot defects in liquid crystal display devices. For instance, in the case of "A Liquid Crystal Display Device" of Japanese Patent Application Laid-Open Hei 1 No. 187,532, a method is disclosed which reduces the amount of light transmitted through a defective pixel by using laser beams to damage a polarizing plate in the area of the defective pixel. In the case of "A Method for the Manufacture of an Active Liquid Crystal Panel" of Japanese Patent Application Laid-Open Hei 3 No. 21,928, a method is disclosed for reducing the amount of light transmitted through a defective pixel by means of burning the color filter of the defective pixel with laser beams so that it becomes gray, and heating the rubbing surface on the side of the pixel electrode so that the orientation of liquid crystal is disturbed. Furthermore, in the case of "A Liquid Crystal Display Device and A Method for the Correction of A Defect in A Liquid Crystal Display Device" of Japanese Patent Application Laid-Open Hei 4 No. 301,615, there is disclosed a method for reducing the amount of light transmitted through a defective pixel by means of using laser beams to form an indentation on the glass substrate corresponding to the defective pixel, and roughening its bottom surface. In the case of "A Method for the Correction of A Defect in A Liquid Crystal Display Device" of Japanese Patent Application Laid-Open Sho 60 No. 243,635, there is disclosed a method for reducing the amount of light transmitted through a defective pixel by using laser beams to irradiate the area of the defective pixel in order to burn aligning film and pixel electrode material so that they lose their capability to control the orientation of the liquid crystal layer, whereby the orientation of the liquid crystal molecules in this area becomes random.

However, in the case of each of the aforementioned methods for the correction of a bright-spot defect in a liquid crystal display device, the amount of light transmitted through the defective pixel is merely reduced to an intermediate level (an intermediate tone) between that characteristic of a voltage-activated state and voltage nonactivated state; the light transmitted through the defective pixel is not completely blocked.

For this reason, when a liquid crystal display device wherein a defective pixel has been corrected to an intermediate tone as above is used in a magnifying projection-type liquid crystal projection apparatus, all of the pixels are magnified so that the defective pixel which has been corrected is also magnified. Thus, in such cases, the problem occurs that the defective pixel is conspicuous and causes a decline in the quality of the projected image when the amount of light transmitted through the defective pixel is merely reduced to an intermediate tone.

Furthermore, none of the aforementioned methods for correction of a bright-spot pixel clearly mention the amount of energy of the laser beam applied to the defective pixel. When a laser beam is used to correct a defective pixel, it is normally necessary to irradiate substantially the entire surface of the defective pixel with the laser beam. Due to this, if the defective pixel is irradiated with laser beams at an energy level equal to or higher than a prescribed value, the problem occurs that even the adjacent, normal pixels are affected, resulting in degradation of the display quality of the liquid crystal display device after correction.

Specifically, as shown in FIG. 1, when a laser beam is used to correct a bright-spot pixel, an irradiation spot 19a, whose shape corresponds to that of a bright spot pixel 18 in a correction area 6a, and a laser irradiation-affected area 20a are generally formed. In this case, since the irradiation spot 19a is made large enough to correct the bright-spot pixel 18, the laser irradiation-affected area 20a also becomes large, such that pixels 17 adjacent to the bright-spot pixel 18 are affected. Thus, when the bright-spot pixel 18 is corrected, the adjacent normal pixels 17 are affected by the laser beam, resulting in deterioration of the display quality of the liquid crystal display device after correction.

SUMMARY OF THE INVENTION

The present invention has been achieved in view of the above problems and it is therefore an object of the present invention to provide a method for the correction of a defect in a liquid crystal display device by which it is possible to prevent a decline in the display quality of the liquid crystal display device after correction of a defective pixel, by almost completely eliminating the transmission of light through the defective pixel, and by eliminating the effect of laser beam irradiation on normal pixels adjacent to the defective pixel.

The present invention was attained in order to achieve the aforementioned object, and its gist resides in that a method for the correction of a defect in a liquid crystal display device equipped with a transmission-type liquid crystal display panel wherein liquid crystal is sealed between a pair of transparent electrodes, pixels for display are arranged in a matrix-like pattern, and display operations are performed by twisted-nematic mode, is characterized such that liquid crystal molecules in the liquid crystal layer of a defective pixel present in the liquid crystal display panel are aligned in a vertical direction.

Furthermore, in the above case, it is effective to irradiate the aforementioned defective pixel with laser beams in order to vertically orient the liquid crystal molecules in the liquid crystal layer of the aforementioned defective pixel.

Furthermore, in the above case, it is effective to perform irradiation with the aforementioned laser beam in a dispersed manner so that two or more irradiation spots are formed on the defective pixel.

Furthermore, in the above case, it is effective to perform irradiation with the aforementioned laser beam in such a way that the irradiation spots are arranged on the defective pixel in a triangular pattern in which they each constitute the apex of a triangle.

The present invention is first configured as above. As a result of vertically orienting the liquid crystal molecules in the liquid crystal layer of the defective pixel, light is transmitted through the liquid crystal layer without being twisted, therefore it is blocked by a polarizing plate in Normally White Mode and is transmitted through a polarizing plate in Normally Black Mode in the case of a liquid crystal display panel which performs display operations in twisted-nematic mode. The amount of light transmitted through the defective pixel can thus be controlled by vertically orienting the liquid crystal molecules. Accordingly, the defective pixel present in the liquid crystal display panel can be made inconspicuous, and as a result, a decline in the display quality of the liquid crystal display device after correction can be prevented. In the above cases, the transparent electrode and aligning film of the defective pixel are burned at the irradiation spots due to irradiation on the defective pixel with laser beams. Thus, the liquid crystal molecules in the liquid crystal layer of the defective pixel are oriented randomly at the irradiation spots due to the absence of transparent electrode and aligning film, whereas they are oriented vertically in the areas around the irradiation spots due to application of electric field by transparent electrode. Therefore, the spots irradiated by laser beams on the defective pixel allow light of an intermediate tone to transmit therethrough, whereas the amount of transmitted light can be regulated in the areas surrounding the laser beam irradiated spots. Accordingly, the defective pixel present in the liquid crystal display panel, as a whole, can be made inconspicuous, and as a result, a decline in the display quality of the liquid crystal display device after correction can be prevented. Furthermore, by performing irradiation in a dispersed manner so that two or more irradiation spots are formed on the defective pixel, it is possible to increase the area around the irradiation spots, that is, the area affected by the laser beam. This feature enlarges area in which the liquid crystal molecules corresponding to the defective pixel are vertically oriented, whereby it is possible to enlarge the area in which the amount of light transmitted through the defective pixel can be controlled. Therefore, the defective pixel present in the liquid crystal display panel can be made even less conspicuous and a decline in the display quality of the liquid crystal display device after correction can be prevented. Furthermore, by performing irradiation with the laser beam in such a way that irradiation spots are arranged on the defective pixel in a triangular pattern in which they each constitute the apex of a triangle, the arrangement of the laser beam irradiation spots formed on the defective pixel can be made a delta arrangement. Thus, by confining the laser beam irradiation spots to within the defective pixel, the area around the irradiation spots which is affected by the laser beam can also be limited to within the defective pixel. Thus, when the defective pixel is irradiated with the laser beam, the effect of the laser beam on the normal pixels adjacent to the defective pixel can be reduced, so that only the defective pixel is corrected. As a result, a decline in the display quality of the liquid crystal display device after correction can be prevented.

Another gist of the present invention resides in that a method for the correction of a defect in a liquid crystal display device equipped with a transmission-type liquid crystal display panel wherein liquid crystal is sealed between a pair of transparent electrodes, pixels for display are arranged in a matrix-like pattern, and display operations are performed by twisted-nematic mode, is characterized in that an aligning film in a defective pixel is irradiated with laser beams via a means for adjusting groove direction which adjusts the direction of grooves formed on the surface of the aligning film, such that minute grooves with an orientation different from the rubbing direction are formed, whereby the orientation of the liquid crystal is changed.

Furthermore, in the above gist of the present invention, it is effective that the orientation of the minute groove formed is different from the rubbing direction by a right-angle. Alternatively, it is also effective that the means for adjusting groove direction is a slit pattern or a blazed grating.

In the method for the correction of a defect as stated above, minute grooves with an orientation different from the rubbing direction are formed on the aligning film in the defective pixel, such that the orientation of the liquid crystal is changed, whereby the defect is corrected. Furthermore, minute grooves are formed on the aligning film by irradiating the aligning film with the laser beam via a slit pattern. Due to the fact that grooves with an orientation different from that of the grooves formed by the original rubbing process are newly formed on the aligning film in the defective pixel by the laser beam via the slit pattern, the liquid crystal molecules are oriented along the newly formed grooves. Thus, if grooves which are oriented at a right angle to the rubbing direction are formed on one of the aligning films, the orientation of the grooves on the opposing aligning films becomes the same, so that the orientation of the liquid crystal molecules is no longer twisted. Accordingly, the rotatory polarization of the liquid crystal molecules is lost. Since the polarizing axis of the polarizing plate on the side of the incident light is perpendicular to the polarizing axis of the polarizing plate on the side of the outgoing light, the incident light is blocked by the pixel, whereby the bright-spot pixel is corrected.

DESCRIPTION OF THE PREFERRED EMBODIMENTS

An embodiment of the present invention is explained as follows using the attached diagrams.

Figure 2:
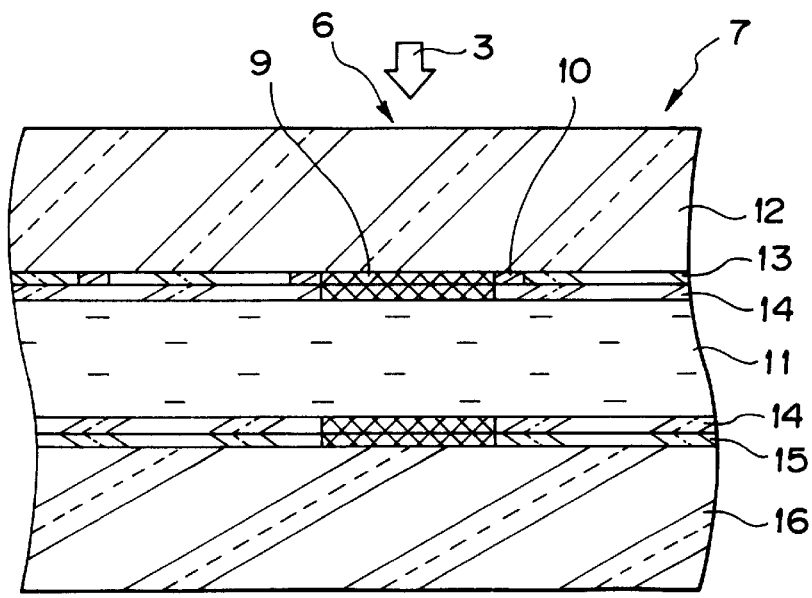
FIG. 2 is a cross-sectional view showing a liquid crystal display panel which is corrected in an embodiment of the present invention.

A liquid crystal display device to which a method of the present invention for the correction of a defect in a liquid crystal display device is applied has a liquid crystal panel (liquid crystal display panel) 7, as shown in FIG. 2. This liquid crystal panel 7 is configured such that a liquid crystal layer 11 is held between an active matrix substrate 12 and an opposing substrate 16, which are placed opposite each other.

Pixel electrodes 13, which are arranged in a matrix-like pattern and TFT 10 switching elements, which are connected to the pixel electrodes 13 have been formed on the glass surface of the aforementioned active matrix substrate 12. Opposing electrodes 15, which face the aforementioned pixel electrodes 13, have been formed on the glass surface of opposing substrate 16. Thus, the aforementioned liquid crystal panel 7 is a transmission-type liquid crystal display panel.

Figure 3:
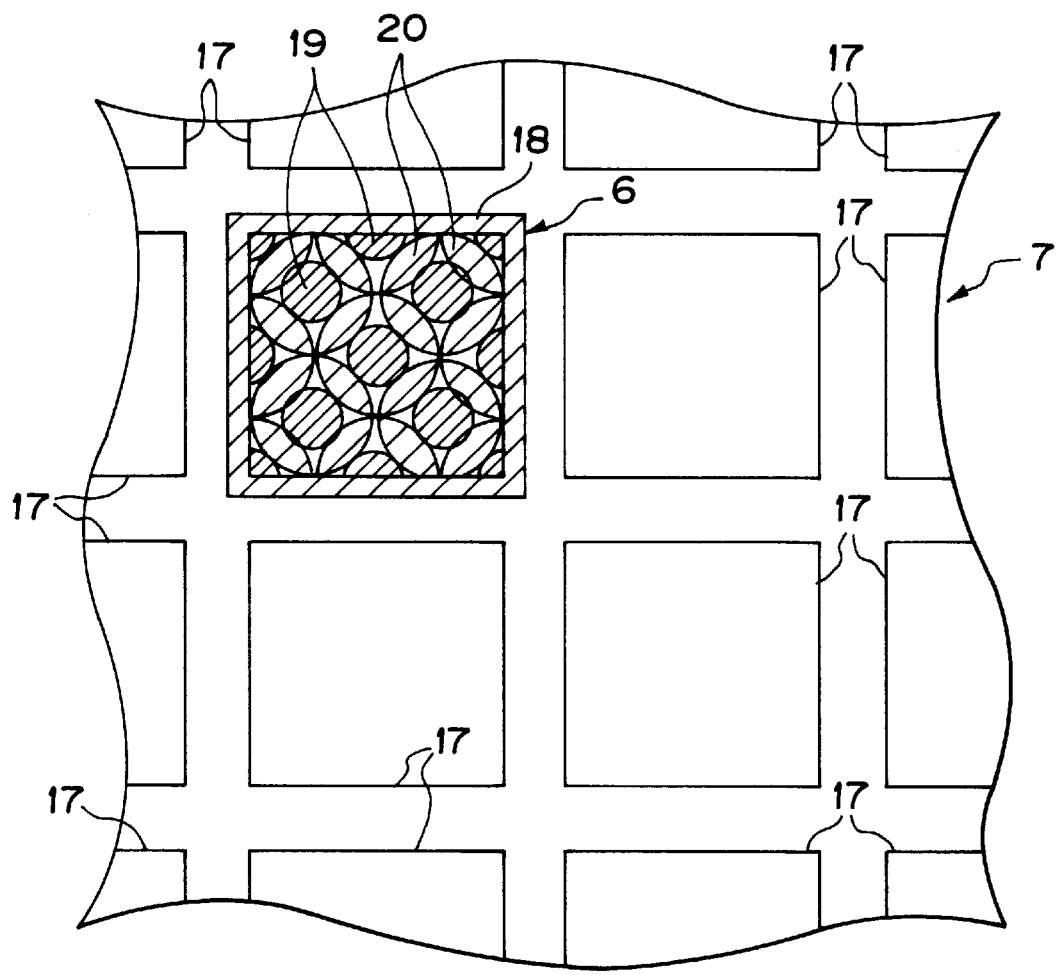
FIG. 3 is a plan view showing how a defective pixel in the liquid crystal display panel shown in FIG. 2 is irradiated with laser beams.

The aforementioned pixel electrodes 13, which consist of a transparent conductive film such as an ITO film, or the like, form pixels 17 in a matrix-like pattern on liquid crystal panel 7, as shown in FIG. 3. Thus, selection and non-selection of all the pixel electrodes 13 on the aforementioned active matrix substrate 12 is carried out by the switching operation of the aforementioned TFT 10, and voltage is selectively applied to pixels 17, resulting in display operation.

Furthermore, the aligning films 14 and 14 are formed on the aforementioned active matrix substrate 12 and opposing substrate 16 with their surfaces in contact with the liquid crystal layer 11. The aligning films 14 and 14 twist the orientation of the liquid crystal molecules in the liquid crystal layer 11 substantially 90°.

Figure 4B:
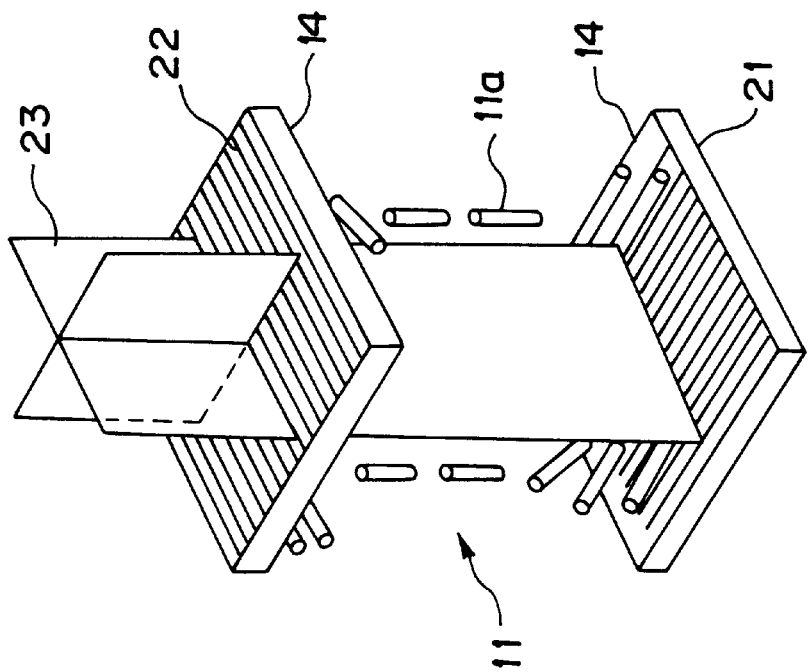
FIG. 4B is a schematic view illustrating the state of orientation of liquid crystal molecules when voltage is applied.
Figure 4A:
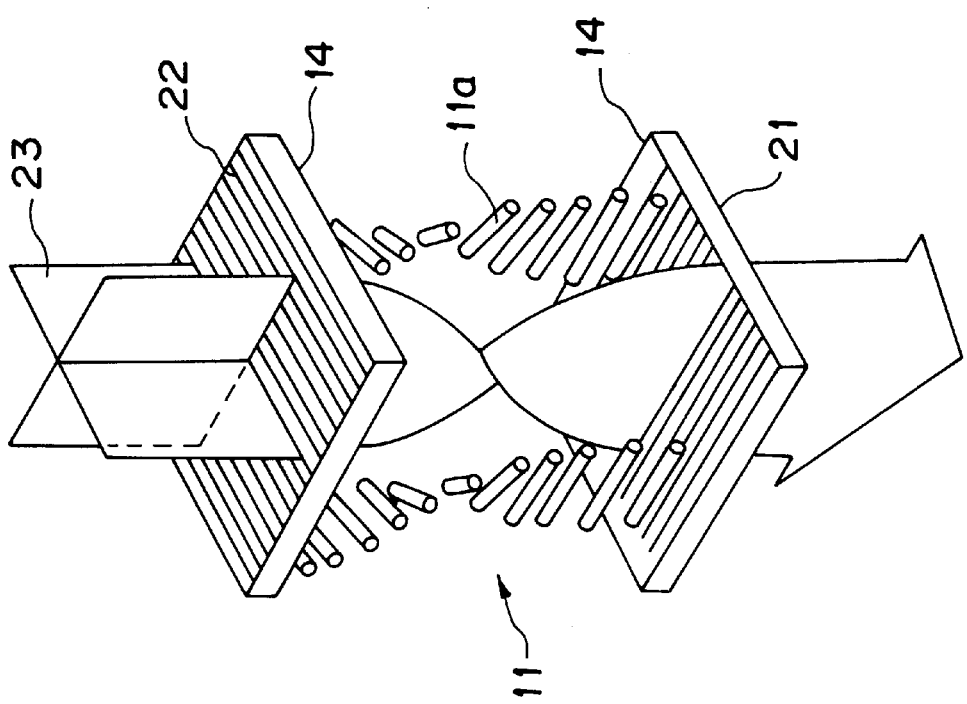
FIG. 4A is a schematic view illustrating the state of orientation of liquid crystal molecules when voltage is not applied.

The typical diagrams given in FIGS. 4A and 4B illustrate the states of orientation of the liquid crystal molecules. FIG. 4A shows the orientation of the liquid crystal molecules when voltage is not applied, and FIG. 4B shows that when voltage is applied.

Specifically, polarizing plates 21 and 22 as shown in FIGS. 4A and 4B are placed on the outer surfaces of the active matrix substrate 12 and the opposing substrate 16 so that their polarizing axes are at a right angle to each other. The polarizing plates 21 and 22 are placed so that when light 23, which is emitted, for instance, by a back light illuminator or the like, enters the liquid crystal layer 11 through polarizing plate 22 from the side of opposing substrate 16, this light 23 is twisted substantially 90° in accordance with the orientation of liquid crystal molecules 11a in the liquid crystal layer 11 whereby the light outgoes from the polarizing plate 21 on the side of active matrix substrate 12.

Thus, the operation mode of the aforementioned liquid crystal panel 7 is twisted-nematic mode, and specifically, Normally White Mode, where light is transmitted when voltage is applied and blocked when voltage is not applied.

Specifically, in the case of the aforementioned liquid crystal panel 7 which is in Normally White Mode, incident light 23 from the side of the opposing substrate 16 is transmitted through the polarizing plate 21 on the side of the active matrix substrate 12 if no voltage is applied to liquid crystal layer 11, due to the fact that the orientation of the liquid crystal molecules 11a is twisted substantially 90°, as shown in FIG. 4A, whereas incident light 23 from the side of the opposing substrate 16 is blocked by the polarizing plate 21 on the side of the active matrix substrate 12 if a voltage equal to or greater than a threshold value is applied to the liquid crystal layer 11, due to the fact that the liquid crystal molecules 11a are oriented in the direction of the electric field, that is, perpendicular to the electrodes, as shown in FIG. 4B.

Generally, TFT 10 has a multi-layered structure consisting of semiconductor layer(s), insulation layer(s), source/drain electrodes, gate electrodes, and the like, on a glass substrate. Thus, there are cases in which a defective TFT 10 which does not perform normal switching operations is formed during the liquid crystal display element manufacturing process. Such a defective TFT 10 is unable to apply a voltage to the corresponding pixel electrode 13, resulting in the formation of a defective pixel electrode 9 (FIG. 2) which is unable to apply a voltage to the liquid crystal layer 11.

Such a defective pixel electrode 9 can be found by searching for a pixel 17 (FIG. 3) which is transmitting light when the liquid crystal panel 7 is driven in the aforementioned Normally White Mode and a voltage is applied to all pixel electrodes 13, in the case that light enters from the side of the opposing substrate 16 of the liquid crystal panel 7. Since this pixel 17 which is in a transmissive state is always in a state of transmitting light (a bright-spot state) regardless of whether or not a voltage is applied to the liquid crystal layer 11, the defective pixel 17 shall be referred to as bright-spot pixel 18.

A method for correcting a bright-spot pixel 18 formed in the aforementioned liquid crystal panel 7 is explained below with reference to the accompanied diagrams. In the present embodiment, an excimer laser is used as a laser light source and XeF is used as the laser filler gas, at an oscillation wavelength of 351 nm which is transmissible through the glass surface. Since an excimer laser is the processing-use laser with the shortest oscillation wavelength, it allows high-precision processing without damage to precision of formation.

First, a defect correction system utilized in the method of the present embodiment for the correction of a defect in a liquid crystal display device is explained.

Figure 5:
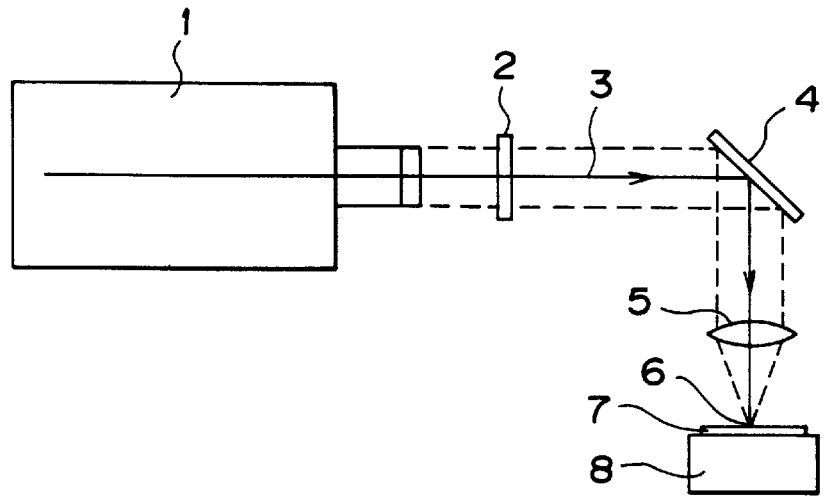
FIG. 5 is a schematic diagram of the configuration of a defect correction system configured for application of a method for the correction of a defect in a liquid crystal display device of respective embodiments of the present invention.

As shown in FIG. 5, the aforementioned defect correction system is equipped with an excimer laser oscillator 1 as a laser light source, and has a mask 2, a UV-reflection mirror 4, a lens 5, a liquid crystal panel 7, and a liquid crystal panel mount 8, which are arranged in the above order along the optical path of laser beams emitted by the excimer laser oscillator 1, starting from the side of the excimer laser oscillator 1. Specifically, a laser beam 3 emitted from the aforementioned excimer laser oscillator 1 passes through slits in the mask 2 and is reflected by the UV-reflection mirror 4, thereafter it passes through lens 5 and converges on the correction area 6 on the liquid crystal panel 7 which is mounted on the liquid crystal panel mount.

The laser beam 3 of the aforementioned excimer laser oscillator 1 is set at an output level such that it can burn a defective pixel electrode 9, the opposing electrode 15 which faces the defective pixel electrode 9, and aligning films 14 and 14 of the liquid crystal panel 7 (areas with a mesh pattern in FIG. 2), when it converges on correction area 6 of the liquid crystal panel 7.

As shown in FIG. 3, the aforementioned mask 2 is formed with slits which allow formation of multiple irradiation spots 19 by laser beam 3 on bright-spot pixel 18 in correction area 6 of the liquid crystal panel 7. In this case, the mask 2 is formed with slits which cause irradiation spots 19 to have an arrangement such that they each constitute the apex of a triangle, namely, a delta arrangement. Thus, irradiation spots 19 are formed by laser beam 3 on bright-spot pixel 18 in a delta arrangement.

The method for correction of bright-spot pixel 18 in the liquid crystal panel 7 using the aforementioned defect correction system is explained next. Here, the size of the opening of the aforementioned bright-spot pixel 18 is 60×60 $\mu$m, and in accordance with this, the laser beam 3 emitted from the aforementioned excimer laser oscillator 1 is set up to have a pulse number of 10, an energy density of 0.7 J/cm, a frequency of 1 Hz, and a beam diameter of 60 $\mu$m, whereas the diameter of the slits of mask 2 is set at 10 $\mu\mu$m.

First, the bright-spot pixel 18 in the liquid crystal panel 7 should be checked. With the polarizing plates attached above and below the liquid crystal panel 7, voltage is applied, the state of transmission of light is observed, and a pixel which is transmitting light is recognized as a bright-spot pixel 18, provided that the operation mode of the liquid crystal panel 7 is Normally White Mode.

Next, after the location of bright-spot pixel 18 has been confirmed, the liquid crystal panel 7 is mounted on the liquid crystal panel mount 8 at the prescribed position, and the correction area 6 is set up according to the position of the bright-spot pixel 18. At this time, the polarizing plates of the liquid crystal panel 7 are removed.

After this, the laser beam 3, which is set at the prescribed output level, is emitted from the excimer laser oscillator 1, and made to converge on the correction area 6 of the liquid crystal panel 7 via mask 2, UV-reflection mirror 4, and lens 5, in order to correct the bright-spot pixel 18. After correction of the bright-spot pixel 18, the polarizing plates are again fitted onto the liquid crystal panel 7.

Thus, as shown in FIG. 3, irradiation spots 19 with a delta arrangement are formed on the bright-spot pixel 18 in the aforementioned correction area 6, and the laser irradiation-affected areas 20 which are affected by laser beam 3 are formed concentrically around respective irradiation spots 19. At this time, since the output of laser beam 3 is set so that it can burn pixel electrode 13, opposing electrode 15 and aligning film 14, as mentioned above, the defective pixel electrode 9, the opposing electrode 15 corresponding to this defective pixel electrode 9, and the aligning films 14 and 14, as shown in FIG. 2, are burned by the irradiation spots 19 on the bright-spot pixel 18, whereas, in the laser irradiation-affected areas 20, the defective pixel electrode 9 and the opposing electrode 15 remain.

Accordingly, the liquid crystal molecules are oriented randomly in the liquid crystal layer 11 corresponding to irradiation spots 19, since defective pixel electrode 9, opposing electrode 15 and aligning films 14 and 14 are gone from this area, whereas in the liquid crystal layer 11 corresponding to the laser irradiation-affected areas 20, since only the aligning films 14 and 14 are gone while the defective pixel electrode 9 and the opposing electrode 15 are remaining, the liquid crystal molecules have an electric field applied thereto by the remaining electrodes and are thus oriented in the direction of the electric field, that is, perpendicular to the substrates.

Figure 6:
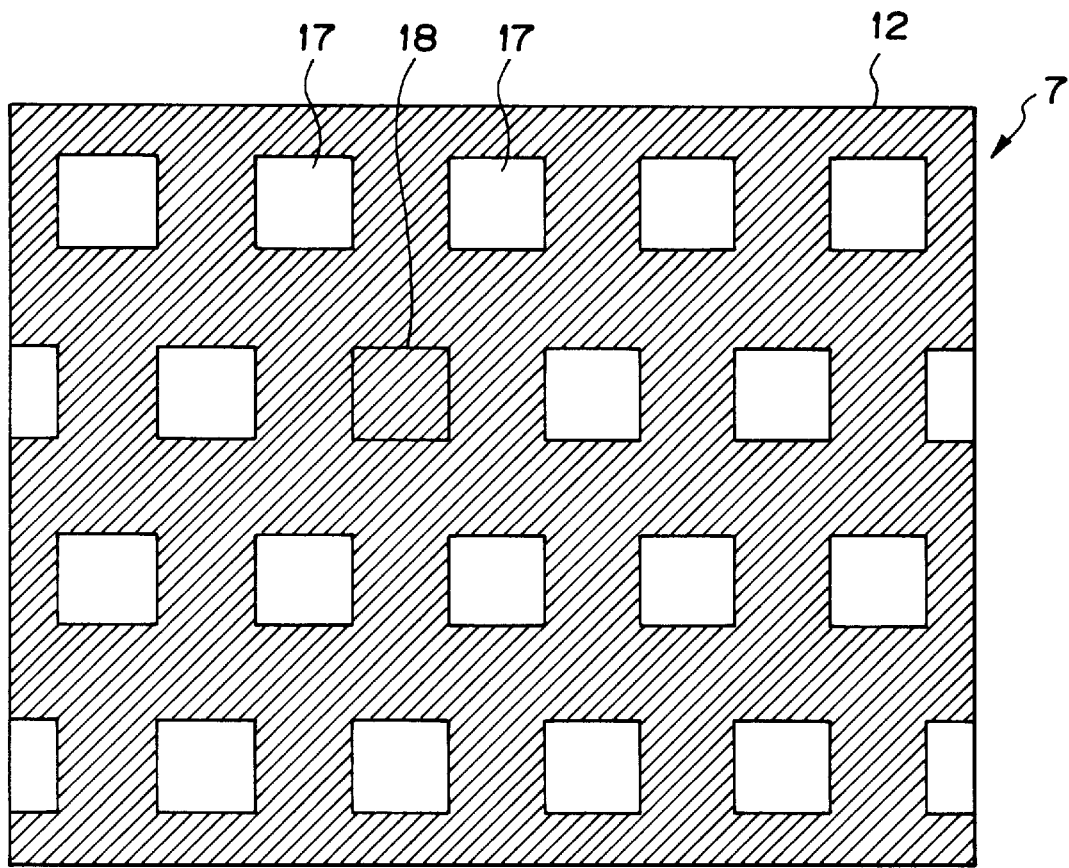
FIG. 6 is a schematic view showing the state of a liquid crystal panel which has been corrected using the defect correction system of FIG. 5, as seen from the side of the active matrix substrate, in the case that it is irradiated with light from the side of the opposing substrate when voltage is not applied.

That is, when polarizing plates are placed on its upper and lower sides of the liquid crystal panel 7 after correction of the bright-spot pixel 18 and voltage is applied, the liquid crystal panel 7 does hardly allow light transmitted from the side of opposing substrate 16, to pass through the corrected bright-spot pixel 18, as shown in FIG. 6. The areas of the liquid crystal panel 7 through which light is transmitted are shown here as void areas, whereas the areas where light is blocked are shown as areas with slanted lines.

Specifically, the liquid crystal molecules at irradiation spots 19 on the bright-spot pixel 18 which has been irradiated with laser beam 3, are oriented randomly so that the amount of light transmitted is intermediate between the amount usually transmitted when voltage is applied and when voltage is deactivated, that is, the luminance is at an intermediate level. At the laser irradiation-affected areas 20 on the bright-spot pixel 18, the liquid crystal molecules are oriented vertically so that the light is blocked by the polarizing plates.

Thus, it is possible to make a bright-spot area on the liquid crystal panel 7 inconspicuous by irradiating the bright-spot pixel 18 with laser beam 3 in the above manner, thus markedly reducing the amount of light transmitted through bright-spot pixel 18. Thereby a decline in image display quality can be prevented when a liquid crystal panel 7 with corrected bright-spot pixels 18 is used in a liquid crystal display device. For instance, in the case that a liquid crystal panel 7 with bright-spot pixels 18 which have been corrected is used in a magnifying projection-type liquid crystal projection device, degradation of the projected image quality can be prevented since the defective pixels which have been corrected are inconspicuous even when the pixels are magnified.

Figure 1:
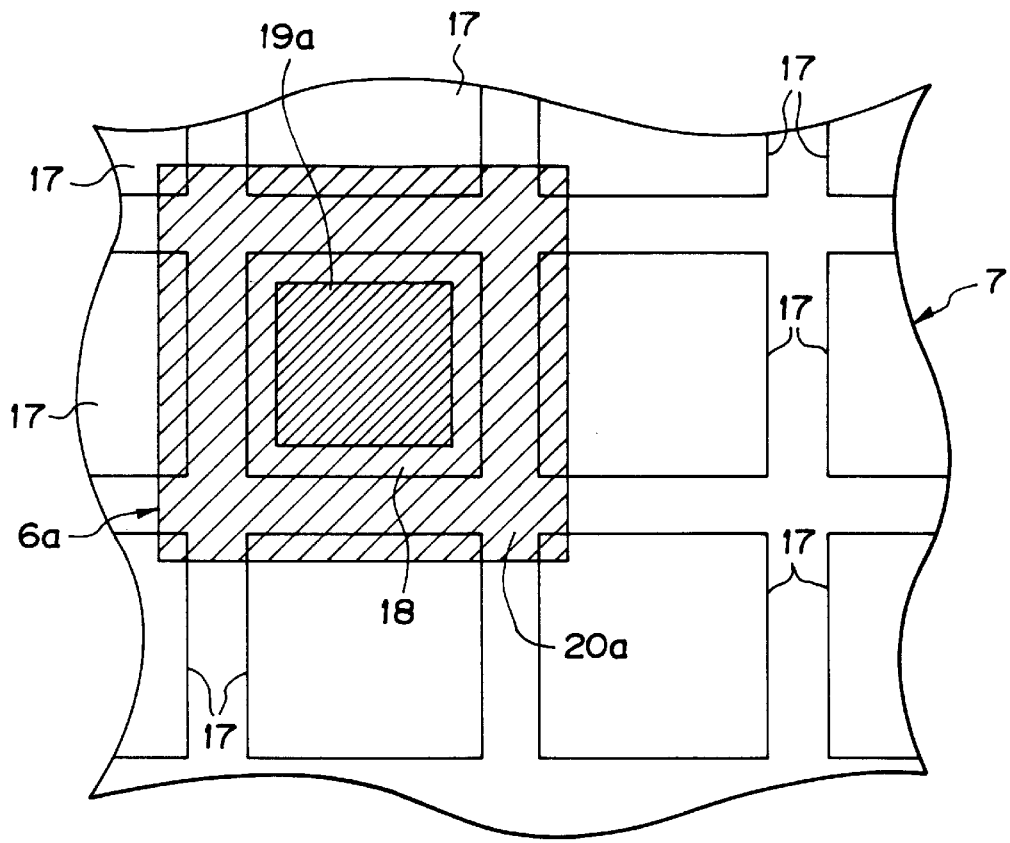
FIG. 1 is a plan view showing how a defective pixel in a liquid crystal display panel is irradiated with laser beams in a conventional method for the correction of a defect in a liquid crystal display device.

Furthermore, in the present invention, the area affected by laser beam 3 can be reduced in size because irradiation spots 19 are formed on the bright-spot pixel 18 in a delta arrangement, as shown in FIG. 3, in contrast with aforementioned FIG. 1. Thus, even when a bright-spot pixel 18 is corrected by irradiation with laser beam 3, it can be corrected by itself without affecting the normal pixels 17 adjacent to this bright-spot pixel 18. As a result, the display quality of the liquid crystal display device after correction can be improved.

Though the output of laser beam 3 is set at the aforementioned conditions for the purposes of the present embodiment, it is not limited to these. For instance, the energy density of laser beam 3 may be made variable. In this case, if the energy density of laser beam 3 is set at a value lower than in the above embodiment, the laser irradiation-affected areas 20 which are formed will become smaller, whereas if the energy density of laser beam 3 is set at a value higher than in the above embodiment, the laser irradiation-affected areas 20 which are formed will become larger. By thus making the energy density of laser beam 3 change, it is possible to change the size of the area where vertically oriented liquid crystal molecules are present in the bright-spot pixel 18. Thus, it is possible to change the amount of light transmitted through the bright-spot pixel 18 at will.

The method of the above embodiment for the correction of a defect in a liquid crystal display device, is applied to a transmission-type liquid crystal display device with a liquid crystal display panel wherein liquid crystal is sealed between a pair of transparent electrodes, pixels for display are arranged in a matrix-like pattern, and display operations are performed by twisted-nematic mode. In such a device, the method of the embodiment corrects a defective pixel by vertically orienting liquid crystal molecules in the liquid crystal layer of the defective pixel.

Therefore, the defective pixel present in the liquid crystal display panel can be made inconspicuous, and as a result, a decline in the display quality of the liquid crystal display device after correction of the defect can be prevented.

In addition to the above effect, if the defective pixel is corrected by irradiating it with laser beams in order to vertically orient the liquid crystal molecules in the liquid crystal layer, the liquid crystal molecules in the liquid crystal layer of the defective pixel can be made to be oriented randomly in the irradiation spots and to be oriented vertically in the areas surrounding the irradiation spots.

Thus, the spots irradiated by the laser beams on the defective pixel allows light of intermediate tone to transmit therethrough, whereas the transmission of light through the areas surrounding the laser-beam irradiated spots can be suppressed. Accordingly, the defective pixel present in the liquid crystal display panel can be made inconspicuous whereby a decline in the display quality of the liquid crystal display device after correction can be prevented.

Furthermore, in addition to the above, if the defective pixel is corrected by performing irradiation with laser beams in such a dispersed manner that two or more irradiation spots are formed on a single defective pixel, the area where the liquid crystal molecules are vertically oriented is enlarged, whereby it is possible to establish an enlarged area that blocks transmission of light in the defective pixel.

Thus, since the area on the defective pixel where the amount of light transmitted can be suppressed is enlarged, the defective pixel present in the liquid crystal display panel can be made inconspicuous whereby a decline in the display quality of the liquid crystal display device after correction can be prevented.

Furthermore, when the defective pixel is corrected by irradiation with laser beams in such a way that the irradiation spots are arranged on the defective pixel in a triangular pattern in which they each constitute the apex of a triangle, the defective pixel alone is corrected because it is possible to reduce the influence of the irradiation spots by the laser beam on adjacent pixels.

Another embodiment of the present invention is explained next using diagrams.

The defect correction system used is the system of FIG. 5 described in the explanation of the previous embodiment. In this system, a bright-spot pixel is corrected by forming grooves on the aligning film in the area of the defective pixel so that the direction of the grooves is different from that of the grooves formed during the original rubbing process. Mask 2 in the aforementioned system of FIG. 5 is used for this purpose as a means for adjusting the groove direction. In a first example, the slit pattern used for the slits of the mask 2 is used.

Figure 7:
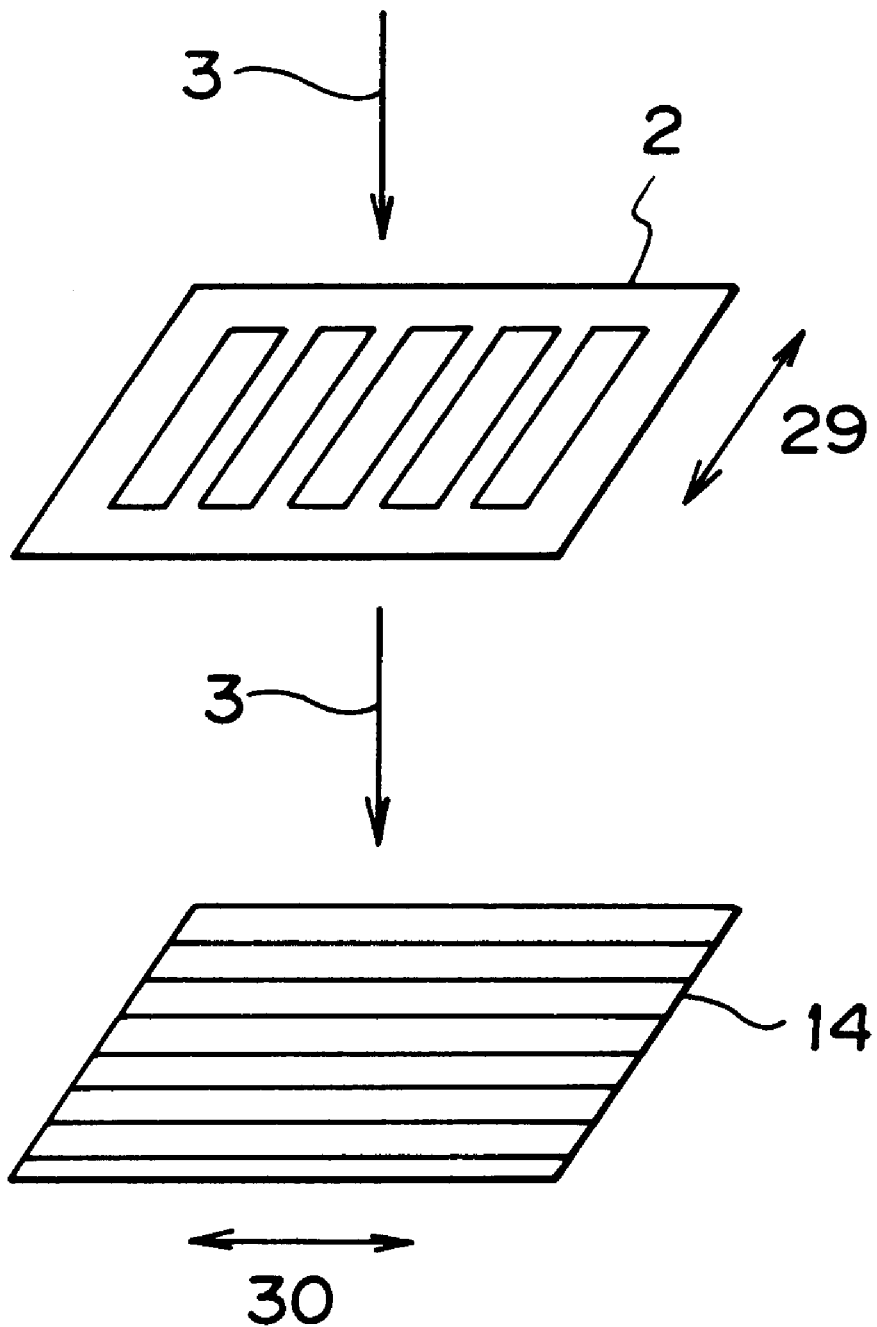
FIG. 7 is an illustration showing the direction of the slit pattern of the mask in relation to the rubbing direction of the aligning film on one side of the liquid crystal panel in a first example of the second embodiment of the present invention.

FIG. 7 is an illustration of the first example, showing the direction of the slit pattern of the mask 2 in relation to the rubbing direction of the aligning film 14 on one side of the liquid crystal panel 7. In FIG. 7, the groove direction 29 of the slit pattern of the mask 2 and the rubbing direction 30 of the aligning film 14 are placed at right angles. Due to the action of the slits placed in this manner, the irradiation spots made by laser beam 3 are partitioned in a direction perpendicular to the rubbing direction of the aligning film, whereby new grooves with a width of a few hundred nm are formed in a direction perpendicular to the direction of the grooves formed on the aligning film 14 by the original rubbing process. Thus, the direction of the grooves on the opposing aligning films 14 becomes the same.

Figure 8A:
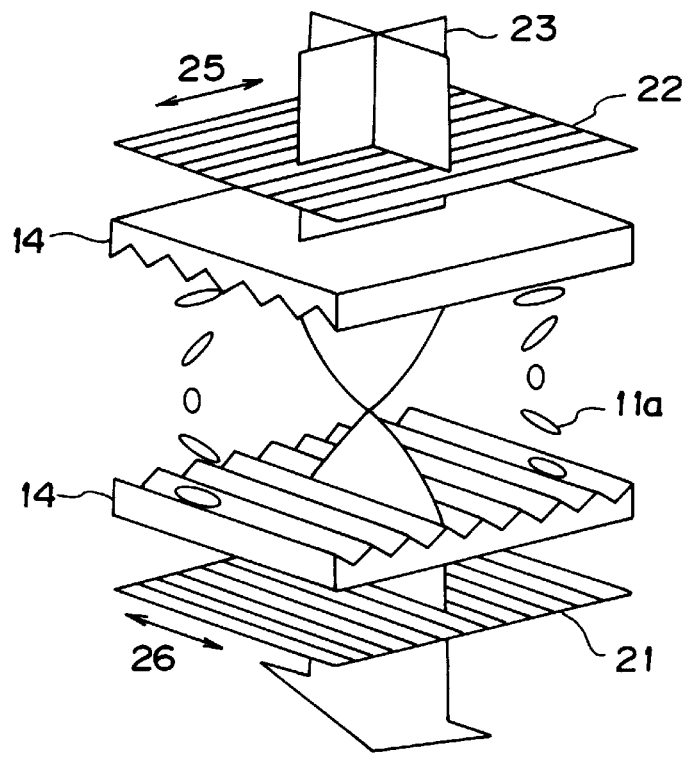
FIG. 8A is a schematic view showing the orientation of liquid crystal molecules in a pixel prior to correction.
Figure 8B:
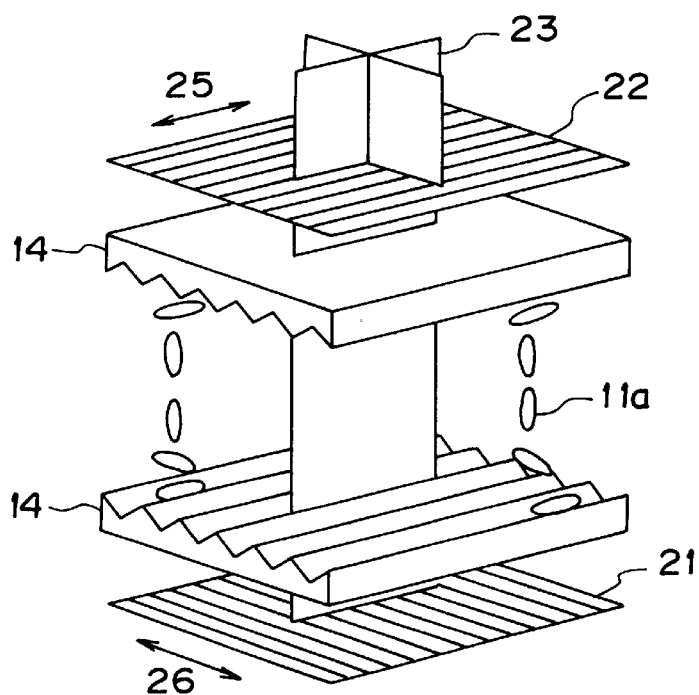
FIG. 8B is a schematic view showing the orientation of liquid crystal molecules in a pixel after correction.

FIGS. 8A and 8B are schematic diagrams respectively showing the orientation of liquid crystal molecules in a pixel prior to and after establishment of new grooves in the aligning film 14. As can be seen from these diagrams, by making the groove direction of the opposing aligning films 14 the same, the state shown in FIG. 8A in which the orientation of the liquid crystal molecules 11*a* is twisted 90° can be changed to the state shown in FIG. 8B in which the liquid crystal molecules 11*a* are no longer twisted. Specifically, the bright-spot pixel can be corrected due to the fact that the rotatory polarization of the liquid crystal molecules 11*a* is lost and the polarizing axis 25 of the polarizing plate 22 on the side of the incident light is at a right angle with the polarizing axis 26 of polarizing plate 21 on the side of the outgoing light, whereby the transmitted light 23 is blocked.

In this case, the laser 3 can be used to make grooves in either the upper or lower aligning film 14.

Figure 9:
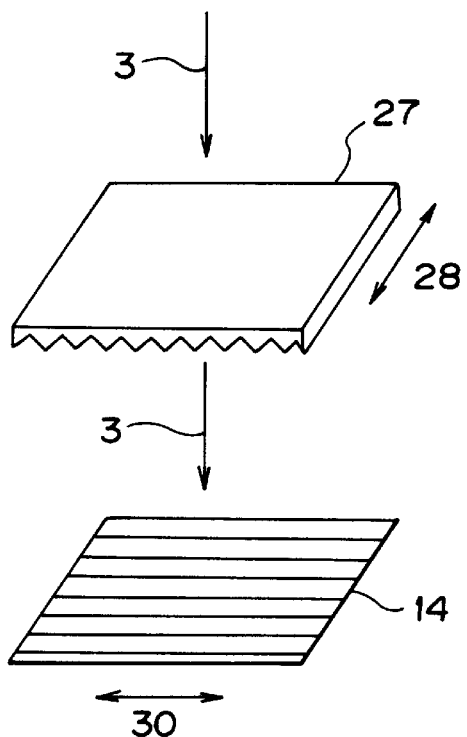
FIG. 9 is an illustration showing the orientation of a blazed grating in relation to the rubbing direction of an aligning film in a second example of a method for the correction of a defect in a liquid crystal display device in the second embodiment.

Next, FIG. 9 shows a second example of the method of the second embodiment for the correction of a defect in a liquid crystal display device, in which case a blazed grating 27 is used as a means for adjusting the groove direction. That is, it shows the orientation of the blazed grating 27 in relation to the rubbing direction 30 of the aligning film 14. In the figure, a reference numeral 28 indicates the groove direction of blazed grating 27 whereas a reference numeral 3 indicates a laser beam. In the same manner as in the case of the slit pattern of FIG. 7, except for the fact that blazed grating 27 is used instead of the slit pattern of the mask 2 in FIG. 7, the irradiation spots made by the laser beam 3 are partitioned by the blazed grating 27 so that minute grooves can be formed on the aligning film 14.

Figure 10:
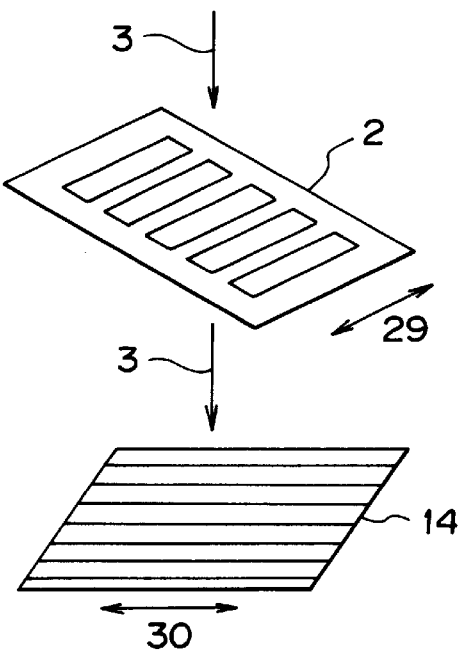
FIG. 10 is an illustration showing the orientation of a slit pattern in relation to the rubbing direction of an aligning film in a third example of a method for the correction of a defect in a liquid crystal display device in the second embodiment.

Furthermore, FIG. 10 shows a third example of the method of the second embodiment for the correction of a defect in a liquid crystal display device. In this example, the groove direction 30 of the slits in the first example above is oriented at will at any angle other than a right angle in relation to the rubbing direction 29 of the aligning film. By irradiation with laser beam 3 via the mask 2, which is placed at an angle other than a right angle, new grooves are formed on the aligning film 14 at an angle other than a right angle in relation to the grooves formed by the original rubbing process. By forming grooves at an angle other than a right angle, the angle of twisting of orientation of the liquid crystal molecules 11*a* is adjusted to give the corrected pixel an intermediate tone between that of a bright-spot and a black spot.

In the above example, the closer the angle of the slit grooves approaches a right angle in relation to the groove direction of the aligning film 14, the closer the tone of the corrected pixel can be made to that of a dark spot, whereas the closer it approaches being parallel to it, the closer it can be made to that of a bright-spot. That is, by modifying the direction of the grooves, the pixel can be adjusted to be any intermediate tone at will.

Furthermore, in the modes shown in FIG. 7 or FIG. 10 above, the laser energy amount can be modified by adjusting the width of slits 2.

As evident from the above embodiment, since the aligning film is irradiated with laser beams via a means for adjusting groove direction such as a slit pattern, blazed grating, or the like, the energy level of the laser beam at the irradiated surface is low. As a result, the present invention makes it possible to correct a defective pixel by itself without affecting other pixels.

What is claimed is:

1. A method for the correction of a defect in a liquid crystal display device equipped with a transmission-type liquid crystal display panel wherein liquid crystal is sealed between a pair of transparent electrodes, pixels for display are arranged in a matrix-like pattern, and display operations are performed by twisted-nematic mode, said method comprising the steps of:

determining a location of a defective pixel;

removing polarizing plates from said liquid crystal display panel;

irradiating said defective pixel by local laser irradiation at a setting sufficient to bum pixel electrode, opposing electrode and aligning film, forming irradiation spots having defective pixel electrode, opposing electrode and aligning films removed therefrom, said irradiation spots having liquid crystal molecules oriented randomly so that an amount of light transmitted is intermediate to an amount transmitted when voltage is applied and an amount transmitted when said voltage is deactivated:

forming irradiation-affected areas having only aligning films removed therefrom and having liquid crystal molecules oriented vertically so that light therefrom is blocked by said polarizing plates; and replacing said polarizing plates on said liquid crystal display panel.

2. A method for the correction of a defect in a liquid crystal display device according to claim 1, wherein said defective pixel is irradiated with laser beams in order to vertically orient the liquid crystal molecules in the liquid crystal layer of said defective pixel.

3. A method for the correction of a defect in a liquid crystal display device according to claim 2, wherein irradiation is performed with said laser beam in a dispersed manner so that two or more irradiation spots are formed on the defective pixel.

4. A method for the correction of a defect in a liquid crystal display device according to claim 3, wherein irradiation is performed with said laser beam in such a way that the irradiation spots are arranged on the defective pixel in a triangular pattern in which they each constitute the apex of a triangle.

5. A method for the correction of a defect in a liquid crystal display device equipped with a transmission-type liquid crystal display panel wherein liquid crystal is sealed between a pair of transparent electrodes, pixels for display are arranged in a matrix-like pattern, and display operations are performed by twisted-nematic mode, said method comprising the steps of:

determining a location of a defective pixel, determining a direction of grooves formed in an aligning film during an original rubbing process;

irradiating with a laser beam proximate to said defective pixel and forming laser grooves in said aligning film, said laser grooves having an orientation different from the direction of grooves formed in said aligning film during said original rubbing process.

6. A method for the correction of a defect in a liquid crystal display device according to claim 5, wherein the orientation of said minute groove formed is different from the rubbing direction by a right-angle.

7. A method for the correction of a defect in a liquid crystal display device according to claim 5 or 6, wherein the means for adjusting groove direction is a slit pattern.

8. A method for the correction of a defect in a liquid crystal display device according to claim 5 or 6, wherein the means for adjusting groove direction is a blazed grating.

* * * * *